June 3, 1969    T. J. DOLPHIN    3,448,357
TENSION CONTROL SYSTEM FOR A REEL DRIVE
Filed Aug. 10, 1966    Sheet 1 of 4

WITNESSES:
Bernard R. Giegner
Leon M. Garman

INVENTOR
Thomas J. Dolphin
BY E. F. Possessky
ATTORNEY

United States Patent Office 3,448,357
Patented June 3, 1969

3,448,357
TENSION CONTROL SYSTEM FOR A REEL DRIVE
Thomas J. Dolphin, Williamsville, N.Y., assignor to Westinghouse Electric Corporation, Pittsburgh, Pa., a corporation of Pennsylvania
Filed Aug. 10, 1966, Ser. No. 571,616
Int. Cl. H02p 7/00
U.S. Cl. 318—6      9 Claims

ABSTRACT OF THE DISCLOSURE

A control system for a direct current reel drive motor regulates the field flux to maintain maximum armature counter electromotive force. The control independently and simultaneously regulates the armature current to produce constant tension in strip being wound on the reel with maximum torque per ampere development.

Background of the invention

The present invention relates to control systems for motor drives and more particularly to control systems for direct current motors used to drive reels on which material is to be wound or unwound under controlled tension.

Tension affects the coiling tightness of a strip or other form of material as it is being wound about or unwound from a reel driven mandrel. It is therefore desirable that strip tension be at least generally controlled during reel operation. Further, in the operation of metal reduction rolling mills and the like, reel strip tension is normally required to be held at a predetermined substantially constant value in order to minimize gauge disturbances and assure proper rolling mill operation.

In order to hold constant tension for direct current reel drive motors, neglecting electrical and mechanical losses of the reel, motor power input can be controlled in proportion to the strip speed. At any predetermined steady state strip speed, it is typical for motor input power to be controlled principally by means of field flux variation. A first control loop holds substantially constant armature current $I_A$ in the direct current motor as the field control varies the field flux $\phi$ in proportion to the variable diameter $D_C$ of the coil on the reel and the armature counter electromotive force is substantially constant at the constant strip speed. Since motor torque $T_M$ is proportional to armature current and field flux ($T_M = K_1 \phi I_A$), the torque $T_S$ and tension $t_S$ applied to the strip by the reel as the coil diameter changes is held substantially constant ($T_S = t_S D_{C/2} = T_M$) by holding the ratio $\phi/D_C$ substantially constant at constant armature current. In selecting direct current motors for reel drive applications, the normal practice thus involves choosing a motor having a field range corresponding to the range of coil buildup.

One disadvantage associated with the variable field tension control is that maximum motor torque capability is realized only when the field flux reaches a maximum at maximum coil diameter. At lower coil diameters, the torque capability is below maximum because the same constant armature current is associated with less than maximum field flux. Such operational inefficiency can be restrictive on reel drive performance. For example, start-up acceleration can be limited to a value less than that desired by the user because at low coil diameter and low field flux the armature current commutating limit restricts the motor input lower level.

Another disadvantage lies in the fact that the field range required for tension control is not always compatible with motor design limits and motor cost considerations. For example, when it is desired to provide an adjustable range of constant tension, design or cost considerations may make it desirable to employ a motor having a first predetermined power rating and a field range greater than that corresponding to the range of coil buildup as opposed to employing a motor having a higher power rating and a field range corresponding to the range of coil buildup. In other cases such as extremely large coil applications, a field range less than that corresponding to the range of buildup may be warranted by motor economics but would not be useable because of the field range-coil buildup correspondence requirement.

Summary of the invention

An improved tension control system is provided for a direct current reel motor drive in accordance with the principles of the present invention. It includes an armature current control and a field control. Armature current is controlled as a function of coil diameter and field flux to hold constant tension. The field control is preferably operated to regulate for maximum counter electromotive force so that the reel drive is efficiently operated at maximum torque per ampere on a continuous basis. Greater economy in motor selection for reel drive applications is made possible because field range selection can be made more freely in meeting tension control performance requirements.

It is therefore an object of the invention to provide a novel tension control system for a reel drive in which improved economy and efficiency are realized.

It is another object of the invention to provide a novel tension control system for a reel drive in which constant tension is realized with maximum torque per ampere operation.

A further object of the invention is to provide a novel tension control system for a reel drive in which field range selection can be made relatively freely from considerations of coil buildup.

An additional object of the invention is to provide a novel tension control system for a reel drive in which motor selection can be made with increased emphasis on motor design economy and decreased emphasis on field range.

It is another object of the invention to provide a novel tension control system for a reel drive in which a large range of coil buildup can be economically and efficiently accommodated by means of a motor having a field range less than that corresponding to the range of coil buildup.

It is a further object of the invention to provide a novel tension control system for a reel drive in which tension control can be economically and efficiently realized by means of a motor having a field range greater than that corresponding to the range of coil buildup.

It is an additional object of the invention to provide a novel tension control system for a reel drive in which improved operation is realized by means of controlling armature current as a function of coil diameter and field flux.

These and other objects of the invention will become more apparent upon consideration of the following detailed description along with the attached drawings.

Description of the preferred embodiment

Figure 1:
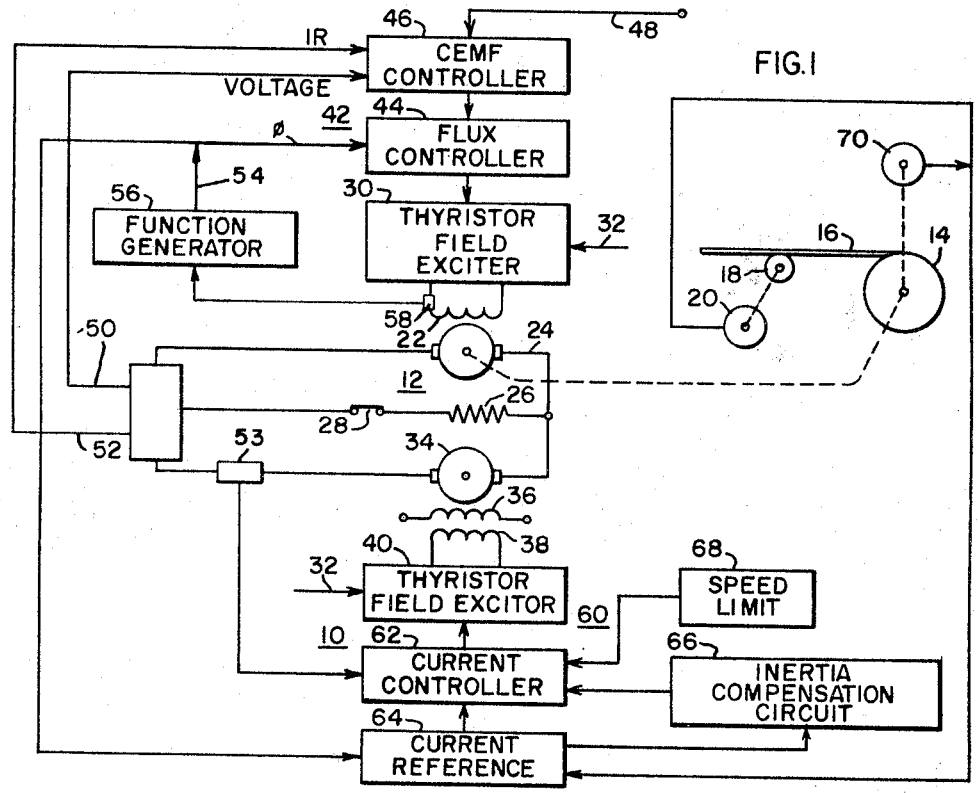
FIGURE 1 shows a schematic diagram of a tension control system for a reel drive arranged in accordance with the principles of the invention.

More particularly, there is shown in FIG. 1 a tension control system 10 arranged in accordance with the principles of the invention to operate a conventional direct current reel drive motor 12, which for example can have a power rating of 500 H.P. with a base speed of 200 r.p.m. and a top speed of 1000 r.p.m. A mandrel 14 is coupled to the reel drive motor 12 and is suitably disposed for winding or unwinding a strip 16 or other suitable form of material when driven by the motor 12.

As an illustrative application, the strip 16 can be steel strip delivered over a guide roll 18 from the last stand of a cold strip steel mill for windup on the mandrel 14. Tension control is thus provided for the strip 16 in order to control the coiling tightness on the mandrel 14 and to aid in strip gauge control at the last mill stand.

The direct current motor 12 is provided with a field winding 22 and an armature circuit 24. Motor torque is developed in the conventional manner by means of interaction between armature current and magnetic field flux. A dynamic braking resistor 26 can be connected in parallel across the armature circuit 24 and connected into or removed from circuit operation by suitable means such as a logic controlled relay contact 28.

Field power is supplied by a suitable source, preferably by means of a thyristor field exciter circuit 30 which is energized by means of an AC power input 32. The thyristor field exciter 30 is organized in a conventional manner with conventional components to provide field voltage and current control by means of thyristor gating angle variation.

Similarly, a suitable source such as a direct current generator 34 is connected in the armature circuit 24 to supply armature current to the motor 12. The generator 34 can for example have a power rating of 400 kw. and a voltage rating of 700 volts, and it is provided with a conventional and suitably energized bias field winding 36 and a main field winding 38 which is preferably supplied by a conventional thyristor field exciter 40. The exciter 40 controls the direct field current and voltage to control the armature voltage and current applied to the motor 12 from the generator 34. If desired, a suitable armature thyristor supply (not shown) can be employed in place of the generator 34 and the thyristor field exciter 40 in controlling the motor armature current and voltage.

In the tension control system 10, a field control 42 includes a conventional electronic flux controller 44 such as a solid state operational amplifier. The flux controller 44 is provided with a set point from the output of a conventional counter electromotive force controller 46 which can also be in the form of a solid state operational amplifier. In turn, a maximum CEMF set point is provided for the CEMF controller 46 from a suitable voltage reference as indicated by the reference character 48. An armature voltage signal and an armature IR drop signal are suitably generated from the armature circuit 24 as respectively indicated by the reference characters 50 and 52 to provide a CEMF feedback for the CEMF controller 46.

In operation, the CEMF controller 46 accordingly continuously produces an output signal which calls for a field flux level resulting in maximum allowable armature counter electromotive voltage. Normally, maximum field flux is thus produced up to the base motor speed and at higher speeds lower field flux levels are generated through the operation of the CEMF controller 46.

To conform the field flux level with that demanded by the CEMF controller 46, the CEMF controller output forms the set point of the flux controller 44 for comparison with a negative feedback signal representative of the field flux level as indicated by the reference character 54. A suitable diode function generator 56 can be connected in the feedback loop to generate the field flux signal 54.

A field current signal is suitably obtained as indicated by the reference character 58 and applied to the diode function generator 56 which develops the feedback signal 54 as a function of the input field current signal or more particularly in accordance with the characteristic relation between the field magnetic flux and the field current. As previously indicated, the resultant output from the flux controller 44 is applied to the thyristor field exciter 30 to produce thyristor gating angle control of the field flux level. Since maximum armature counter electromotive voltage is always produced during the operation of the reel drive motor 12, a maximum torque per ampere value is realized for all armature current operating values.

The tension control system 10 further includes an armature control 60 which applies an input signal to the thyristor or field exciter 40 to control the thyristor gating angle and ultimately the motor armature voltage and current applied by the generator 34. In this instance, the armature control 60 includes a current controller 62 in the form of a solid state operational amplifier which develops a thyristor gating angle control signal in response to the combined effects of a plurality of input control signals.

In particular, the current controller set point is provided by a current reference circuit 64 and an armature current signal 53 is applied as a feedback input to the current controller 62 for comparison to the set point value. Further, inertia compensation can be provided during changes in strip speed by an output signal from a suitable inertia compensation circuit 66. A limit can be placed upon the output from the current controller 62 from a suitable speed limit circuit 68. With variation in the error difference between the armature current feedback signal 53 and the current set point signal as compensated or limited by the other control input signals, the output signal from the current controller 62 is varied to change the generator voltage and current in a direction of armature current error reduction.

In accordance with the principles of the present invention, armature current is controlled by the armature control 60 in order to control the tension of the strip 16 as maximum motor torque per ampere is developed through operation of the CEMF controller 46 in the field control 42. Preferably, the strip tension is regulated for a substantially constant value at any strip speed within a predetermined range of strip speeds. To produce tension control, the armature current demand is made to vary as a function of the variable diameter of the coiled strip as well as the CEMF controlled value of the motor field flux.

To produce constant tension control, the motor armature current demand is made directly proportional to the coil diameter and inversely proportional to the field flux level. It is preferred that the armature current demand be controlled by controlling the current controller set point, that is by controlling the output of the current reference circuit 64 by means of predetermined feedback signals applied as reference circuit inputs.

In this instance, the field flux signal 54 is applied as an input to the current reference circuit 64 as a basis for making the current reference output inversely proportional to the field flux level. Since the coil diameter $D_C$ is substantially equal to the strip speed S divided by the angular speed ω of the motor 12 or the mandrel 14, an output signal from a strip speed tachometer 20, which is coupled to the guide roll 18 or if desired to the last mill stand, and another output signal from an angular reel speed tachometer 70 are combined to provide a basis for making the output from the current reference circuit 64 directly proportional to the coil diameter.

For constant tension control at a predetermined strip speed, the armature current $$I_A \text{ equals } K_2 \cdot \frac{D_C}{\phi}$$

under the operation of the armature current controller 62. Since the motor torque $T_M = K_1 \cdot \phi \cdot I_A$ or $t_S \cdot D_C$, the strip tension $$t_S = \frac{K_1 \phi I_A}{D_C} = \frac{K_1 K_2 \phi}{D_C} \cdot \frac{D_C}{\phi} = K_3$$

or a constant value when the armature current is made directly proportional to the coil diameter and inversely proportional to the field flux. As will subsequently be described more fully, tension control as thus obtained principally by means of armature current variation results in improved motor application economy as well as improved efficiency based upon continuous maximum torque per ampere development.

Figure 2:
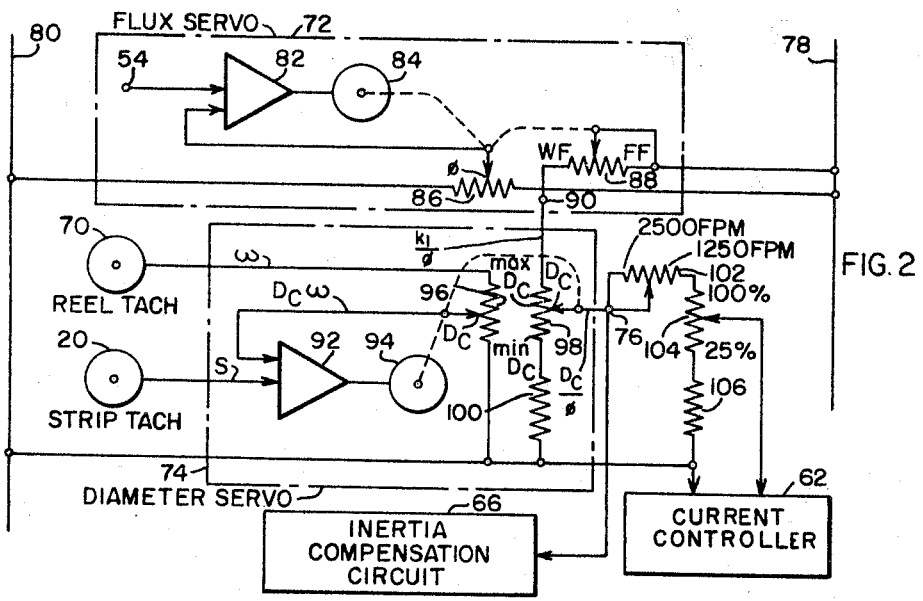
FIG. 2 shows a schematic diagram of a portion of the tension control system shown in FIG. 1.

In FIG. 2, there is illustrated in greater detail circuitry which can be employed to form the current reference circuit 64. In this instance, the reference circuit 64 includes a flux servo subcircuit 72 coupled to a diameter servo subcircuit 74 to produce a signal proportional to $D_C/\phi$ at a circuit junction indicated by the reference character 76. Additional potentiometer circuitry couples the coil diameter-flux ratio signal to the input of the current controller 62. Potentiometer operating voltage is applied to the reference circuit 64 between a direct current bus 78 and a common or ground connection as indicated by the reference character 80.

In the flux servo subcircuit 72, the flux level signal 54 is applied to an input of a conventional operational amplifier 82 which energizes a suitable servo drive device 84. A feedback potentiometer 86 and a flux inversion potentiometer 88 are coupled to the output of the servo device 84 to be positioned as a function of the magnitude of the flux level signal 54. The arm position of each potentiometer 86 or 88 is proportional to the flux level as indicated by the weak field and full field symbols WF and FF.

At any given value for the flux level signal 54, the potentiometers 86 and 88 are driven until positioned at a point where the feedback voltage from the potentiometer 86 equals the voltage value of the flux signal 54. With increasing field flux, the arm of the flux inversion potentiometer 88 is moved away from an output terminal 90 of the flux servo subcircuit 72. Additional voltage drop is thus created in the circuit between the bus 78 and the output terminal 90 to cause a decreased potential level at the output terminal 90. An inversion signal is accordingly produced at the terminal 90 and it is represented by the relationship $$V_1 = k_1 \cdot \frac{1}{\phi}$$

In the diameter servo subcircuit 74, the output from the strip tachometer 20 is applied to the input of another conventional operational amplifier 92 which also energizes a suitable servo drive device 94. A feedback potentiometer 96 and a coil diameter-flux ratio potentiometer 98 are coupled to the output of the servo device 94. The feedback signal from the potentiometer 96 to an input of the operational amplifier 92 is made proportional to the product of the coil diameter and the angular reel speed by employing the output of the reel tachometer 70 as the supply voltage for the potentiometer 96. Thus, the potentiometers 96 and 98 are jointly positioned by the servo drive 94 until the feedback signal from the potentiometer 96 is equal to the strip speed signal S.

With potentiometer position represented by the multiplier $D_C$, the feedback signal is equal to the product $D_C\omega$. Accordingly, at equilibrium the strip signal $S=D_C\omega$. In other terms, the potentiometer position $$D_C = \frac{S}{\omega}$$

is representative of the coil diameter. Since the output $V_1$ from the flux servo subcircuit 72 is applied as a supply voltage across the ratio potentiometer 98 and a voltage dropping resistor 100, the output from the diameter servo subcircuit 74 at the terminal 76 is proportional to the ratio $D_C/\phi$.

In operation, the maximum and minimum positions of the ratio potentiometer 98 correspond to maximum and minimum coil diameters as indicated in FIG. 2. Before each operation involving a new coil diameter, the reference circuit 64 is suitably adjusted to provide correspondence between the ratio potentiometer limits and the coil diameter range.

The output from the ratio potentiometer 98 is in this instance applied across a tension limit or a speed potentiometer 102 and a tension potentiometer 104 through a voltage dropping resistor 106 to the common bus 80. The output of the reference circuit 64 is formed by the potentiometer arm of the tension potentiometer 104 which is coupled to an input of the current controller 62.

As indicated in FIG. 2, the speed potentiometer 102 can be provided with a range corresponding to a predetermined strip speed adjustment range, for example from 1250 feet per minute to 2500 feet per minute. To provide decreased tension limit at increased run strip speed, the speed potentiometer 102 is adjusted to decrease the fraction of the coil diameter-flux ratio voltage applied to the tension potentiometer 104 thereby relatively decreasing the armature current demand signal.

For any preset tension limiting strip speed, the tension potentiometer 104 is adjusted to provide a preset constant strip tension value within a predetermined range such as 25% to 100%. Increased tension at any particular speed potentiometer setting is obtained by increased demand for armature current and is therefore obtained by increasing the voltage output from the tension potentiometer 104 to the current controller 62.

The inertia compensation signal for the current controller 62 can be produced by suitable logic contact control and with conventional compensation circuitry similar to that used on constant current control reel systems. However, the input drive to the inertia compensation circuit 66 preferably is provided from the coil diameter-flux ratio potentiometer output terminal 76 rather than from a fixed DC signal. In this manner, motor torque is suitably controlled to provide linear acceleration or deceleration at substantially constant strip tension even though armature current is variable.

After the necessary circuit adjustments are made in the reference circuit 64 for a coil windup operation, the reel motor 12 and the mill which feeds the strip 16 are started. The startup current reference signal causes stall armature current to flow in the reel motor 12, and as strip speed is increased by the mill, the current reference signal is varied to cause reel acceleration toward the run strip speed with strip tension control. After run strip speed is reached, the coil diameter continues to increase as the reel motor speed decreases.

Strip tension is held substantially constant by armature current control in the windup operation. In particular, increases in coil diameter tend to increase the ratio signal $D_C/\phi$ thereby tending to increase the current demand through the armature current control 62. Until the reel motor drops to its base speed, increases in field flux tend to decrease the ratio signal thereby tending to decrease armature current demand. On an overall and continuous basis, the ratio signal simultaneously adjusts to changes in field flux and coil diameter to provide armature current variation resulting in strip tension regulation substantially at the preset constant value.

Generally, employment of the armature current controlled reel drive system provides motor application economy with the efficiency of maximum motor torque operation. For example, motors with reduced power rating can be employed where the motor field range is greater than the coil diameter range in order to obtain an extended range of tension adjustment. As a specific illustration, if the coil diameter range has a ratio of 2 to 1 and it is desired to employ a motor having a 4 to 1 field range, the motor power rating can be one half of that required for a 2 to 1 field range motor. However, the maximum reel tension is available only to 50% of the rated run strip speed. Above the 50% run strip speed value, the maximum available reel tension is varied inversely with the preselected maximum run speed. To prevent exceeding rated current at the higher mill speeds, the maximum tension that can be set (100% by adjusting the tension potentiometer 104) is limited by the speed potentiometer 102 by selecting its setting in correspondence with the selected mill speed if it is above the 50% speed value. Once a preset mill speed is selected it cannot be changed while the reel drive is operating, but it is possible to operate the reel drive at speeds below the selected preset speed by operation of a suitable hold pushbutton circuit or arrangement (not shown).

Figure 3A:
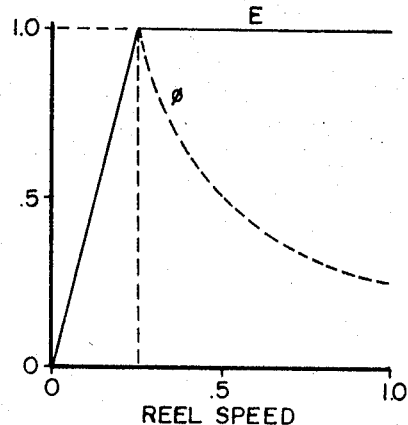
FIGS. 3A through 5F show a series of curves representing the controlled operation of the reel system in FIG. 1 under various operating conditions.
Figure 3D:
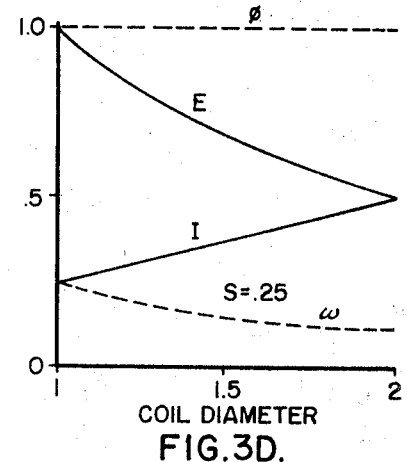
Figure 3B:
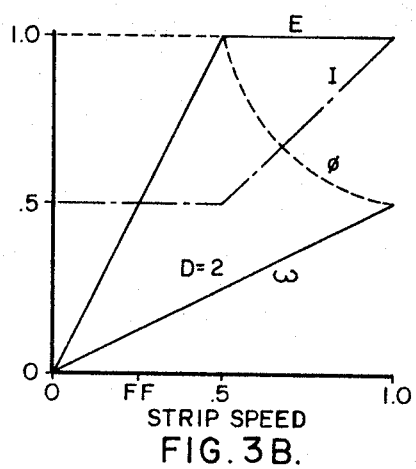
Figure 3E:
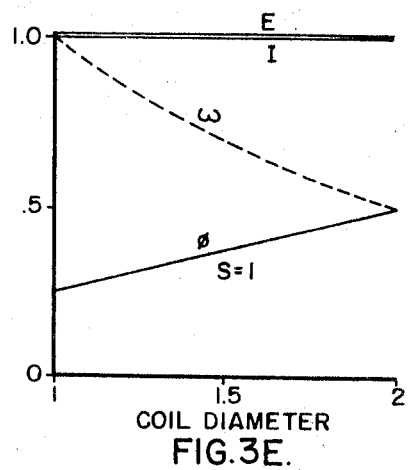
Figure 3C:
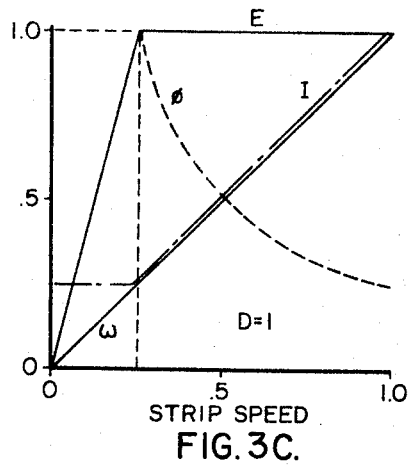
Figure 3F:
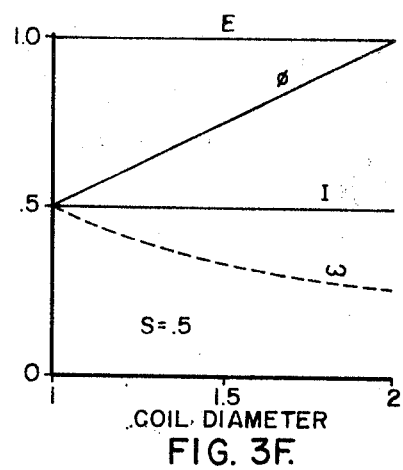
Figure 4A:
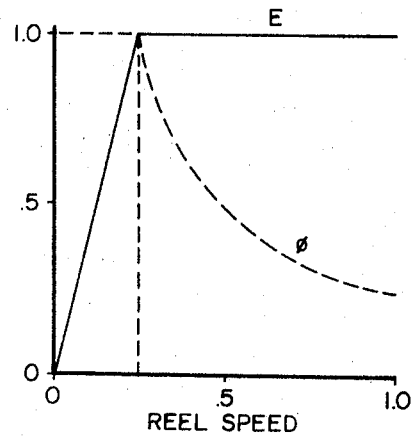
Figure 4D:
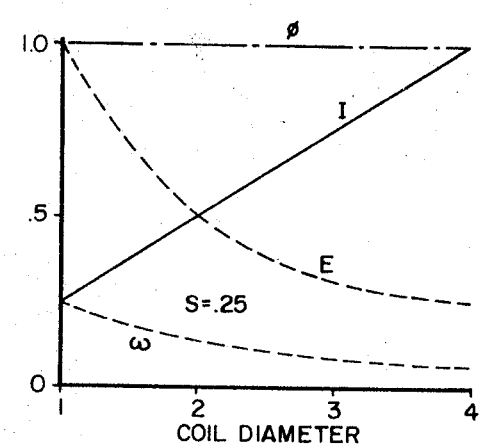
Figure 4B:
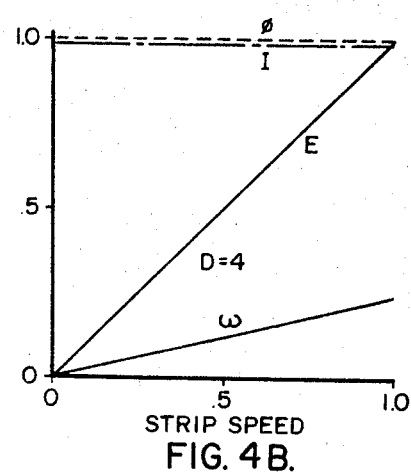
Figure 4E:
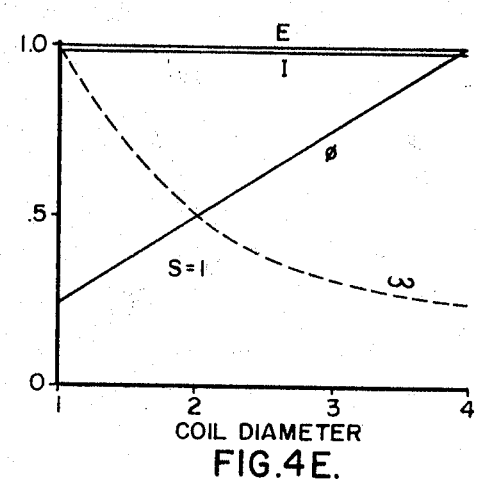
Figure 4C:
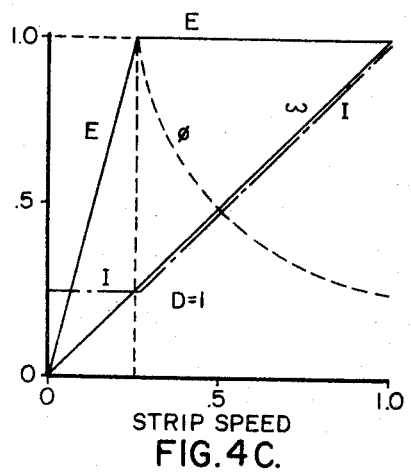
Figure 4F:
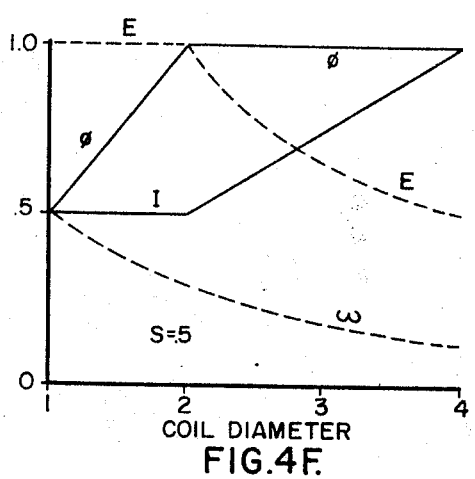
Figure 5A:
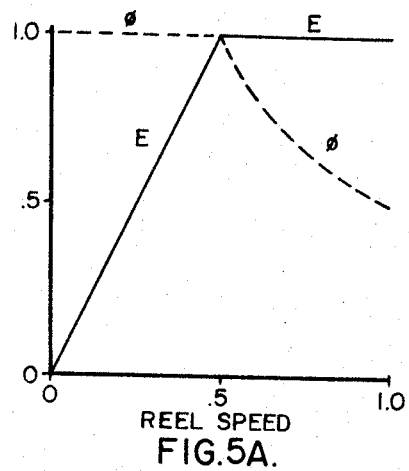
Figure 5D:
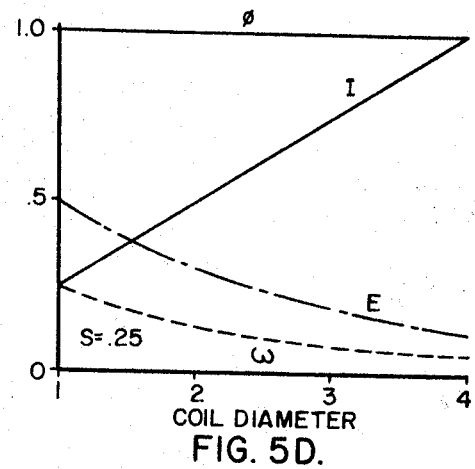
Figure 5B:
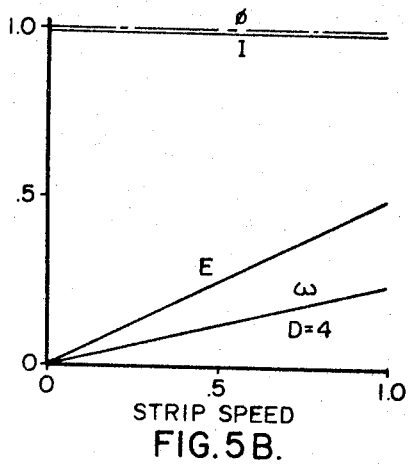
Figure 5E:
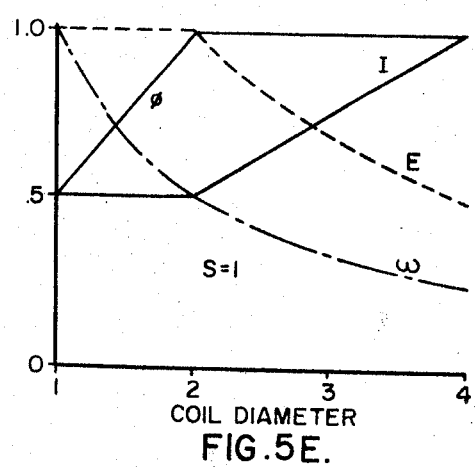
Figure 5C:
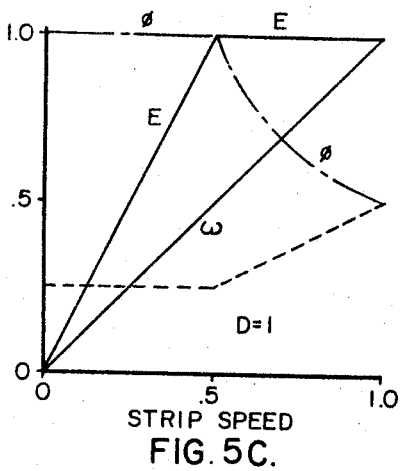
Figure 5F:
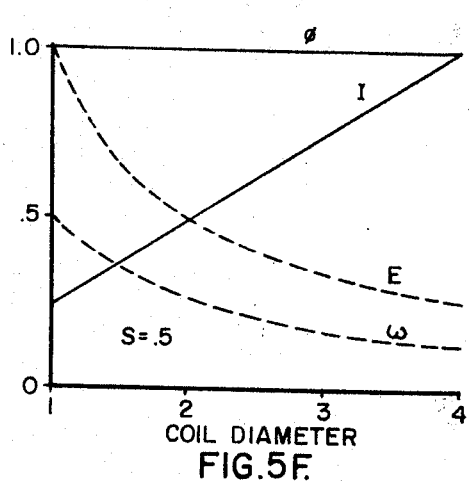

In FIGS. 3A–3F, there are shown various curves representing reel drive operating characteristics with assumed zero inertia for the case where the coil diameter has a range of 2 to 1 and the motor field has a range of 4 to 1. In particular, FIG. 3A shows that rated armature voltage is developed from base reel speed to full reel speed by means of decreasing field flux. At speeds lower than base speed, the field flux is at the maximum value and the counter electromotive voltage is below the maximum value. FIGS. 3B and 3C respectively show the armature current and voltage and the field flux and the reel speed as a function of strip speed at constant strip tension and respectively at a coil diameter of 2 and at a coil diameter of 1. In FIGS. 3D through 3F, the same parameters are shown as a function of the coil diameter at constant strip tension and at respective values of strip speed equal to 0.25 and 1 and 0.5.

Where the coil buildup range and the motor field range are equal, the motor 12 operates at the maximum field flux for all reel motor operating speeds above base speed. Below base speed of the reel motor 12, the flux is held at maximum or full field value and the armature current rises with coil diameter buildup to maintain constant tension. In thise case, the tension limitation by the speed potentiometer 102 on the maximum available tension provided by the tension potentiometer 104 is not necessary and the speed potentiometer 102 accordingly can be omitted from the circuit of FIG. 2. In FIGS. 4A–4F curves similar to those shown in FIGS. 3A–3F are shown for the case with the coil diameter and the motor field range both have a ratio of 4 to 1.

If the motor field range is less than the coil diameter range, a motor having a relatively increased power rating would normally be required in applying the invention, but an advantage is gained in the sense that a satisfactory means of design is provided when an extremely large range of coil buildup is to be controlled. For example, a 2 to 1 motor field range for a 4 to 1 coil buildup range would require a motor having twice the power rating and twice the base speed of a 4 to 1 field range motor used under the application limitations of the conventional constant armature current reel drive system. However, the 4 to 1 field range motor for the coil buildup range in a particular application may require an unfeasible or uneconomic motor design. FIGS. 5A–5F also show curves similar to those shown in FIGS. 3A–3F for the case where the coil diameter range has a ratio of 4 to 1 and the motor field range has a ratio of 2 to 1.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A tension control system for a direct current reel drive motor operative to wind or unwind a coil of strip material or the like, said system comprising means for controlling the field flux, means for controlling the armature current independently of the field flux, means for operating said flux controlling means to maintain maximum armature counter electromotive force through field flux variation, and means for operating said armature current controlling means to vary the armature current as a function of the field flux level and the coil diameter for strip tension control.

2. A tension control system as set forth in claim 1 wherein the latter operating means operates said armature current controlling means to vary the armature current as a function of the field flux level and the coil diameter in order to regulate the strip tension to a substantially constant value.

3. A tension control system as set forth in claim 1 wherein the latter operating means operates said armature current controlling means to vary the armature current substantially in direct proportion to the coil diameter and substantially in inverse proportion to the field flux level in order to regulate the strip tension to a substantially constant value.

4. A tension control system as set forth in claim 1 wherein means are provided for sensing the strip and reel speeds to develop a feedback signal representing coil diameter for said armature current control means.

5. A tension control system as set forth in claim 1 wherein means are provided for sensing the field current level to develop a feedback signal representing field flux for said armature current controlling means.

6. A tension control system as set forth in claim 1 wherein said armature current controlling means is provided with an armature current feedback input, means are provided for supplying a reference input for said armature current controlling means, and means are provided for sensing predetermined reel system conditions and applying corresponding signals to said reference supplying means in order to develop a reference directly proportional to the coil diameter and inversely proportional to the field flux level.

7. A tension control system as set forth in claim 6 wherein said reference supplying means includes means for adjustably limiting maximum strip tension in correspondence to preset run strip speed.

8. A tension control system as set forth in claim 6 wherein said reference supplying means includes means for adjustably establishing a preset strip tension.

9. A tension control system as set forth in claim 6 wherein said reference supplying means is a reference circuit including a flux servo subcircuit responsive to a field flux signal and a diameter servo subcircuit responsive to reel and strip speed signals, and said flux servo subcircuit is coupled to said diameter servo subcircuit to develop a reference input signal directly proportional to the coil diameter and inversely proportional to the field flux level.

References Cited

UNITED STATES PATENTS

| | | | |
|---|---|---|---|
| 2,583,074 | 1/1952 | Allbert et al. | 318—154 X |
| 2,583,148 | 1/1952 | Kimball et al. | 318—154 X |
| 2,665,401 | 1/1954 | Pell | 318—7 |
| 2,747,148 | 5/1956 | Peeples | 318—6 |
| 3,183,427 | 5/1965 | Hawkins et al. | 318—353 X |
| 3,189,804 | 6/1965 | Dolphin et al. | 318—6 |

BENJAMIN DOBECK, *Primary Examiner.*

B. A. COOPER, *Assistant Examiner.*

U.S. Cl. X.R.

318—154